US008549541B2

(12) United States Patent
Moyer et al.

(10) Patent No.: US 8,549,541 B2
(45) Date of Patent: Oct. 1, 2013

(54) BRIDGING LOCAL DEVICE COMMUNICATIONS ACROSS THE WIDE AREA

(75) Inventors: Stanley Moyer, Mendham, NJ (US); David Famolari, Montclair, NJ (US); David Marples, Notts (GB)

(73) Assignee: Intellectual Ventures II LLC, Wilmington, DE (US)

( * ) Notice: Subject to any disclaimer, the term of this patent is extended or adjusted under 35 U.S.C. 154(b) by 1811 days.

(21) Appl. No.: 11/091,555

(22) Filed: Mar. 28, 2005

(65) Prior Publication Data

US 2005/0232283 A1 Oct. 20, 2005

Related U.S. Application Data

(60) Provisional application No. 60/556,909, filed on Mar. 26, 2004.

(51) Int. Cl.
*G06F 9/44* (2006.01)
*G06F 15/173* (2006.01)
*G06F 15/177* (2006.01)

(52) U.S. Cl.
USPC ............................ 719/318; 709/221; 709/230

(58) Field of Classification Search
USPC .................. 455/435.1, 435.2; 709/201–229; 719/311–314, 330–332
See application file for complete search history.

(56) References Cited

U.S. PATENT DOCUMENTS

| | | | |
|---|---|---|---|
| 6,618,764 B1 * | 9/2003 | Shteyn | 709/249 |
| 6,845,393 B1 * | 1/2005 | Murphy et al. | 709/220 |
| 6,970,869 B1 * | 11/2005 | Slaughter et al. | 1/1 |
| 7,207,041 B2 * | 4/2007 | Elson et al. | 718/104 |
| 7,461,143 B2 * | 12/2008 | Bodin et al. | 709/223 |
| 2001/0047431 A1 * | 11/2001 | Eytchison | 709/249 |
| 2003/0004744 A1 * | 1/2003 | Greene et al. | 705/1 |
| 2003/0144894 A1 * | 7/2003 | Robertson et al. | 705/8 |
| 2004/0002936 A1 * | 1/2004 | Majumder et al. | 707/1 |
| 2004/0148416 A1 * | 7/2004 | Aarnos et al. | 709/230 |
| 2004/0199616 A1 * | 10/2004 | Karhu | 709/221 |
| 2004/0255302 A1 * | 12/2004 | Trossen | 719/318 |
| 2005/0114491 A1 * | 5/2005 | Bushmitch et al. | 709/223 |
| 2005/0267952 A1 * | 12/2005 | Ricciardi et al. | 709/220 |

OTHER PUBLICATIONS

Allard J et al. "Jini Meets UPnP: An Architecture for Jini/UPnP Interoperability" Jan. 2003 IEEE pp. 1-8.*
Tokunaga Eiji "A Framework for Connecting Home Computing Middleware" 2002 ICDSW pp. 1-6.*
Sameh Ahmed "Modeling Jini-UPnP Bridge using Rapide ADL" Jul. 2004 ICPS pp. 1.*

(Continued)

*Primary Examiner* — Charles E Anya

(57) ABSTRACT

In a network of devices having a plurality of local domains, each local domain is likely to comprise a plurality of networks or communities of devices that communicate using a shared native protocol such as Jini, UPnP, Bluetooth, HAVi, WiFi, WiMAX or other standard architectures and protocols. The Open Services Gateway initiative (OSGi) created a platform and method for various networks to communicate with one another in a local domain. OSGi does not, however, solve the problems associated with communication across local domains. An instant messaging protocol such as Session Initiation Protocol (SIP) and a remote services register are used to provide a means for communication between local devices in a plurality of local OSGi domains using native communications protocols.

31 Claims, 5 Drawing Sheets

(56) References Cited

OTHER PUBLICATIONS

Lucenius Jan "Implementing Mobile Access to Heterogeneous Home environment" 2003 VTT Technical Research Centre of Finland pp. 1-22.*

"UPnP, Jini and Salutation—A look at some popular coordination for future networked devices", Techguide, Internet, Jun. 17, 1999, pp. 1-7. Internet printout: http:/www.cswl.com/whiteppr/tech/upnp.html.

JINI Network Technology Architectural Overview, Internet, Jan. 1999, pp. 1-11. Internet printout: http:/www.sun.com/software/jini/whitepapers/architecture.html.

"HAVi, the A/V digital network revolution", Technical Background,HAVi Home Audio Video Interoperability, 1999, pp. 1-7.

"Understanding Universal Plug and Play", Microsoft Windows Me Millennium Edition Operating System, 2000, pp. 1-39.

Pavlin Dobrev et al, "Device and Service Discovery in Home Networks with OSGi", IEEE Communications Magazine, Aug. 2002, pp. 86-92.

Jini Network Technology "An Executive Overview", Sun Microsystems, Inc., Feb. 2001, pp. 1-16.

"Jini Technology and Emerging Network Technologies", JINI Network Technology White Papers & Other Documents, Internet, pp. 1-3. Internet printout: http://www.sun.com/software/jini/whitepapers/technologies.html.

* cited by examiner

BRIDGING LOCAL DEVICE COMMUNICATIONS ACROSS THE WIDE AREA

The present application claims the benefit of U.S. Provisional Application No. 60/556,909 filed on Mar. 26, 2004, entitled "Bridging Local Device Communications Across the Wide Area."

FIELD OF THE INVENTION

Our invention relates generally to communication between devices in different, remote domains. More particularly, our invention relates to methods and apparatus for enabling devices in different remote local domains to discover and communicate with one another with each device using its native device communication protocol to perform this discovery and communication.

DESCRIPTION OF THE BACKGROUND

The number homes and offices having networks continue to increase along with an ever-increasing number of networked devices within the home and/or home office. Home networking has led to the sharing of a printer among many desktop computers or the sharing of a common high-speed Internet connection, such as a cable modem connection or digital subscriber line (DSL) connection among multiple computers. Although relatively new, an ever-increasing number of home appliances are also part of a home network and may even be controlled through connections to the Internet. These factors, along with the arrival of new classes of small, intelligent, network-ready personal computing devices, including smart phones, PDAs and tablets computers, are making the home an increasingly important networking center.

The number of communication technologies used to interconnect these devices increases along with the increasing use of home networking. The Jini interface, Salutation architecture, UPnP architecture, X10, HomePlug architecture, HomePNA architecture and HomeRF technology, Bluetooth technology, HAVi technology, HiperLAN technology, the various WiFI (IEEE 802.11a/b/g) technologies, IEEE 802.15 standard interface, IEEE 1394 and, the recently proposed WiMAX architecture are only some of the various choices. Within a given technology, devices can discover and communicate with each other to share the services each provides, thereby creating compound services. However, to fully exploit the capabilities of residential networks, these diverse device networking technologies need to be coordinated so that devices between different technologies can discover and communicate with each other to provide compound services across these difference device technologies.

In response to this need, the Open Services Gateway Initiative (OSGi) defined the services gateway (An overview of the OSGI service gateway can be found in "Device and Service Discovery in Home Networks with OSGi", by Pavlin Dobrev, David Famolari, Christian Kurzke, and Brent Miller, IEEE Communications Magazine, August 2002). The OSGi services gateway serves as a central coordination point for managing the home network, integrating the multiple heterogeneous standard device communication technologies and allowing for device interoperability. In general, the OSGi services gateway comprises an OSGi service registry and a plurality of driver bundles, each bundle corresponding, for example, to a device technology. In the OSGi environment, devices and the services they provide are represented as OSGi services and in particular, are represented as OSGi objects within the service registry, thereby making the services generally known throughout the OSGi environment. In particular, devices and services found by a native discovery technology can be imported into the OSGi framework so that they appear as registered OSGi objects, making these services and devices fully accessible by other OSGi entities. Similarly, registered OSGi devices and services can be "exported" out of the OSGi framework, so that these devices and services become discoverable using native discovery techniques of the communication technologies. This mechanism enables cross-technology discovery. In addition, the OSGi services gateway provides protocol conversions so that devices from different technologies can communicate using their native techniques. This mechanism thereby enhances interoperability across multiple device types.

The driver bundles perform this importing and exporting of devices/services and protocol conversions. In particular, a driver bundle for a given technology will discover services within that technology, transform them to the OSGi service representation, and register the service within the OSGi service registry (i.e., importing services). Similarly, the bundle will discover services that are registered in the OSGi framework that are compliant with the given technology and make these services known to its environment (i.e., exporting services). Lastly, a bundle provides conversion drivers that allow a device in one technology to use its native protocols to communicate with devices of another technology, thereby sharing services.

FIG. 1 is an exemplary network OSGi service domain 100 comprising an OSGi gateway 110 bridging a Jini network (community) 120 and an UPnP network (community) 130. The OSGi gateway 110 comprises an OSGi service registry 114, a Jini driver bundle 112 (i.e., an OSGi bundle), and an UPnP driver bundle 116 (i.e., OSGi bundle). The Jini network 120 comprises a personal computer (PC) 122 and another Jini device 124, each running the Jini communication technologies. The UPnP network 130 comprises a laptop computer 132 and another UPnP device 134, each running the UPnP communication technology. Without the OSGi service gateway, the UPnP communication technology on the laptop computer 132 and device 134 only allows the UPnP laptop to discover the UPnP device 134 and to utilize the services of that UPnP device. However, the UPnP laptop is not able to discover or communicate with the Jini device 124. A similar situation exists for the PC 122 and the Jini device 124 and UPnP device 134. The OSGI gateway 110 overcomes these issues.

Specifically, the UPnP driver 116 performs UPnP-to-OSGi transformations and OSGi-to-UPnP transformations. Similarly, the Jini driver 112 performs Jini-to-OSGi transformations and OSGi-to-Jini transformations. More specifically, the UPnP architecture introduces the control point as a device manager entity. A control point discovers newly joined devices using the information that these devices advertise. As such, when connected to a network, UPnP controlled devices multicast their presence and advertise specific services so that interested control points can detect them and subsequently use their capabilities. When a control point joins an UPnP community, it can request specific devices and services using UPnP protocols. A device can be both a control point and a controlled device at the same time.

To support the UPnP-to-OSGi transformation, the UPnP driver 116 implements the functionality of a UPnP control point, which detects newly connected devices by receiving their multicast announcements and by transmitting a discovery request to the UPnP community. The UPnP driver 116 uses the XML device description documents that are received from UPnP devices (132 and 134) to register the corresponding OSGi services by transforming the XML document to an OSGi representation.

The UPnP driver 116 also manages the OSGi-to-UPnP transformation, exporting OSGi services to the UPnP network as UPnP devices. To perform the transformation for exporting devices, the UPnP driver 116 listens for newly registered services in the OSGi service registry 114. OSGi defines a service property that specifies a service as UPnP compliant. When a new service appears in the OSGi service registry and that service has properties that identify it as compatible with the UPnP architecture, then the UPnP base driver exports information about that service to the UPnP network, using UPnP protocols. The virtual UPnP device (OSGi service) then appears in the UPnP network just like any other UPnP device.

The Jini architecture uses a Jini lookup service as the device manager entity. When devices/services are attached to the Jini community, they register themselves with the lookup service, and uploads a service object that implements all of the services interfaces for the device. When another device in the Jini community needs a service, it queries the lookup service, loads the service object, and uses the service object to communicate with the registered device.

To support the Jini-to-OSGi transformation, the Jini driver uses the Jini discovery utilities to listen for new lookup services in the Jini community. When a new lookup service appears, the driver retrieves the service object, transforms the object to an OSGi representation, and registers the service in the service registry. Similarly, the Jini driver 112 manages the OSGi-to-Jini transformation, exporting OSGi services to the Jini community as Jini devices. To perform the transformation for exporting devices, the Jini driver listens for newly registered services in the OSGi service registry. Again, OSGi defines a service property that specifies a service as Jini compliant. When a new service appears in the registry and that service has properties that identify it as compatible with the Jini architecture, then the Jini driver exports registers the service in a lookup service, making the Jini device (OSGi service) appear in the Jini community just like any other Jini device.

Accordingly, through the above mechanisms, elements within the Jini community can discover both Jini and UPnP based devices and elements within the UPnP community can discover both UPnP and Jini devices. However, the service gateway 110 and the driver bundles 112 and 116 found therein also enable the two communities to communicate using native communication technologies. Specifically, the UPnP driver 116 also implements OSGi APIs that allow other bundles (e.g., the Jini driver) on the OSGi gateway 110 (e.g., the Jini driver) to invoke the services of a UPnP device such as device 134 using standard OSGi methods. Similarly, the Jini driver 112 implements OSGi APIs that allow other driver bundles on the gateway (e.g., the UPnP driver 116) to invoke the services of a Jini device such as device 124 using standard OSGi methods. Accordingly, when the UPnP laptop computer 132 discovers the Jini device 124, it communicates with the UPnP driver 116 using native UPnP mechanisms. The UPnP driver 116 then communicates with the Jini driver 112 using OSGi mechanisms. Finally, the Jini driver 112 communicates with the Jini device 124 using native Jini mechanisms.

While the OSGi services gateway 110 allows heterogeneous devices within an OSGi domain 100 (i.e., all devices visible to the gateway) to discover and communicate with each other using native communication technologies, the OSGi services gateway 110 does not allow devices on different gateways (i.e., different OSGi domains) to discover and communicate with each other using native protocols. In addition, many of the communication technologies do not operate across the wide area (i.e., the only support communications among devices on the same local area network) and as such, devices within the same community cannot discover and communicate with one another. For example, FIG. 2 shows two OSGi service domains 200 and 250, each comprising an OSGi service gateway 210, a Jini network 220, and an UPnP network 230. Similar to FIG. 1, each Jini network 220 comprises a PC 222 and a Jini device 224 and each UPnP network 230 comprises a laptop computer 232 and an UPnP device 234. The OSGi service gateways 210 do not allow devices on the Jini and UPnP networks in the disparate OSGi service domains 200 and 250 to discover and communicate with each other. In addition, the OSGi gateways 210 do not allow devices in each Jini network community and in each UPnP community to discover and communicate with each using native communications.

Significantly, mechanisms exist that allow systems (like a PC) on an external network, such as the Internet, to control devices on local networks. However, these mechanisms have several shortcomings. In particular, the external system must know the local device exists. In other words, no discovery mechanism is available that automatically discovers the local devices. In addition, the external device and local network must have custom communication mechanisms in order to support the communications.

SUMMARY OF OUR INVENTION

Accordingly, it is desirable to provide methods and systems that overcome the shortcomings of the prior art by providing for a system and method that enables devices on one device network (or community) in one OSGi domain to discover and communicate with devices on another device network (or community) in another OSGi domain The present invention provides a system for enabling the communication between a first device on a first network associated with a first domain and a second device on a second network associated with a second domain. Each local domain includes a services gateway in communication with the associated networks wherein the services gateway comprises device drivers, a local service registry, an instant messaging protocol bundle and an integrated services application. A remote services registry in communication with the integrated services application of each services gateways provides a way to register which services are available between domains. The remote services registry communicates with the integrated services application of each services gateways through the instant messaging protocol bundle of each gateway. The remote service registry comprises a database containing the address/location of the devices/services that may be shared across domains. The integrated services application of a gateway periodically queries the remote services registry to determine if there are any additional devices on another network in another domain that are available for communication. The instant messaging protocol bundle can be based on the Session Initiation Protocol (SIP) standard or another instant messaging protocol that supports messaging and presence.

DETAILED DESCRIPTION OF OUR INVENTION

Figure 1:
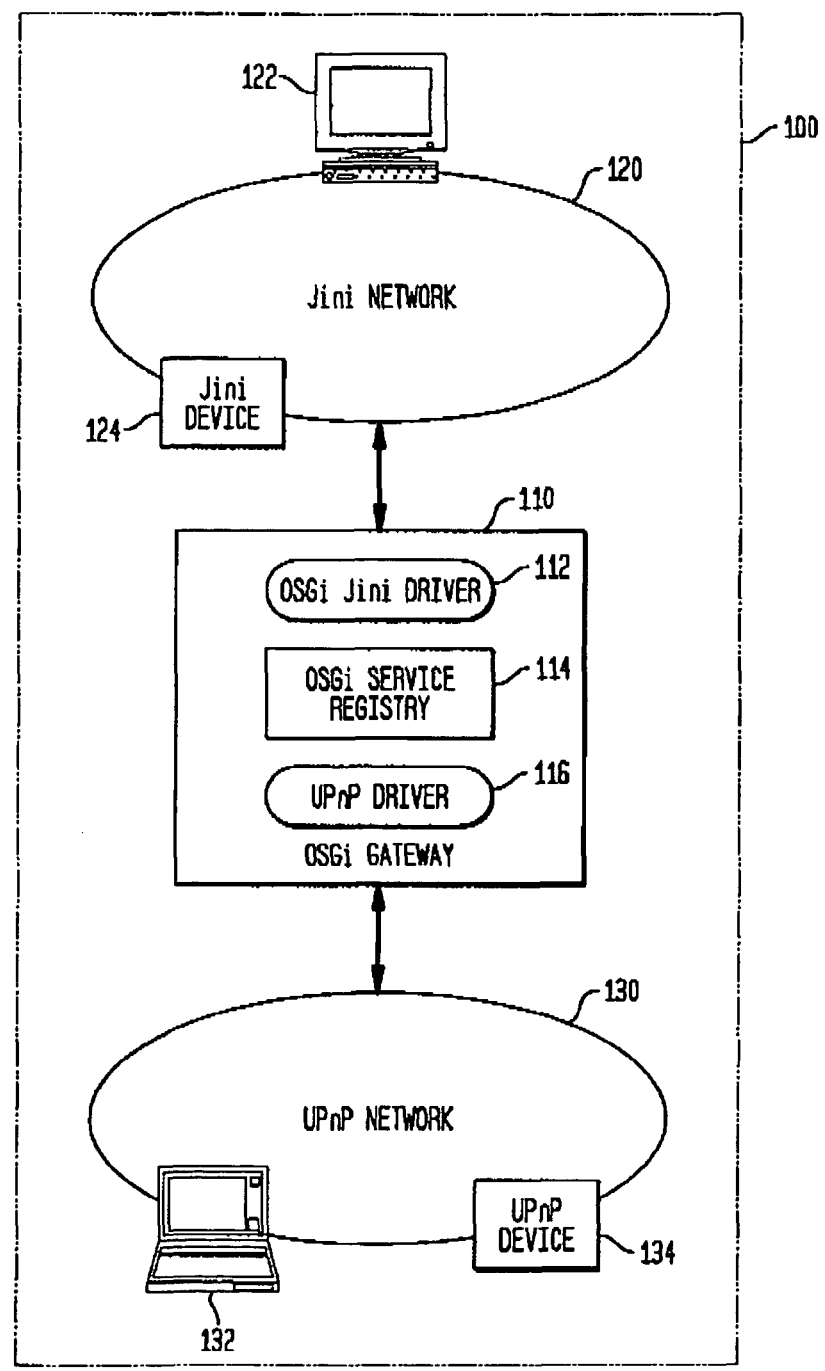
FIG. 1 is depicts OSGi domain in which a Jini network and an UPnP network communicate via an OSGi gateway.
Figure 2:
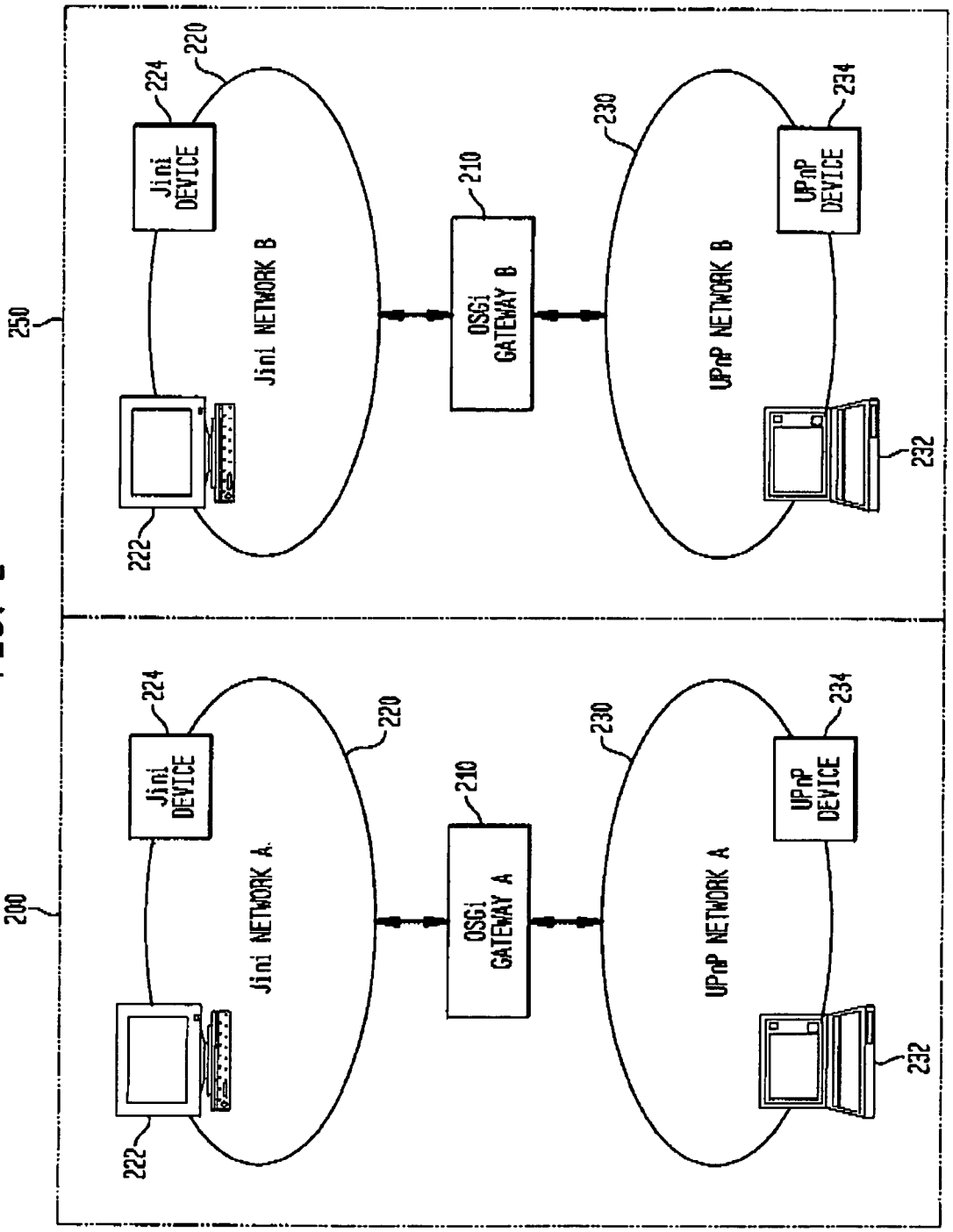
FIG. 2 depicts two separate OSGi domains
Figure 3:
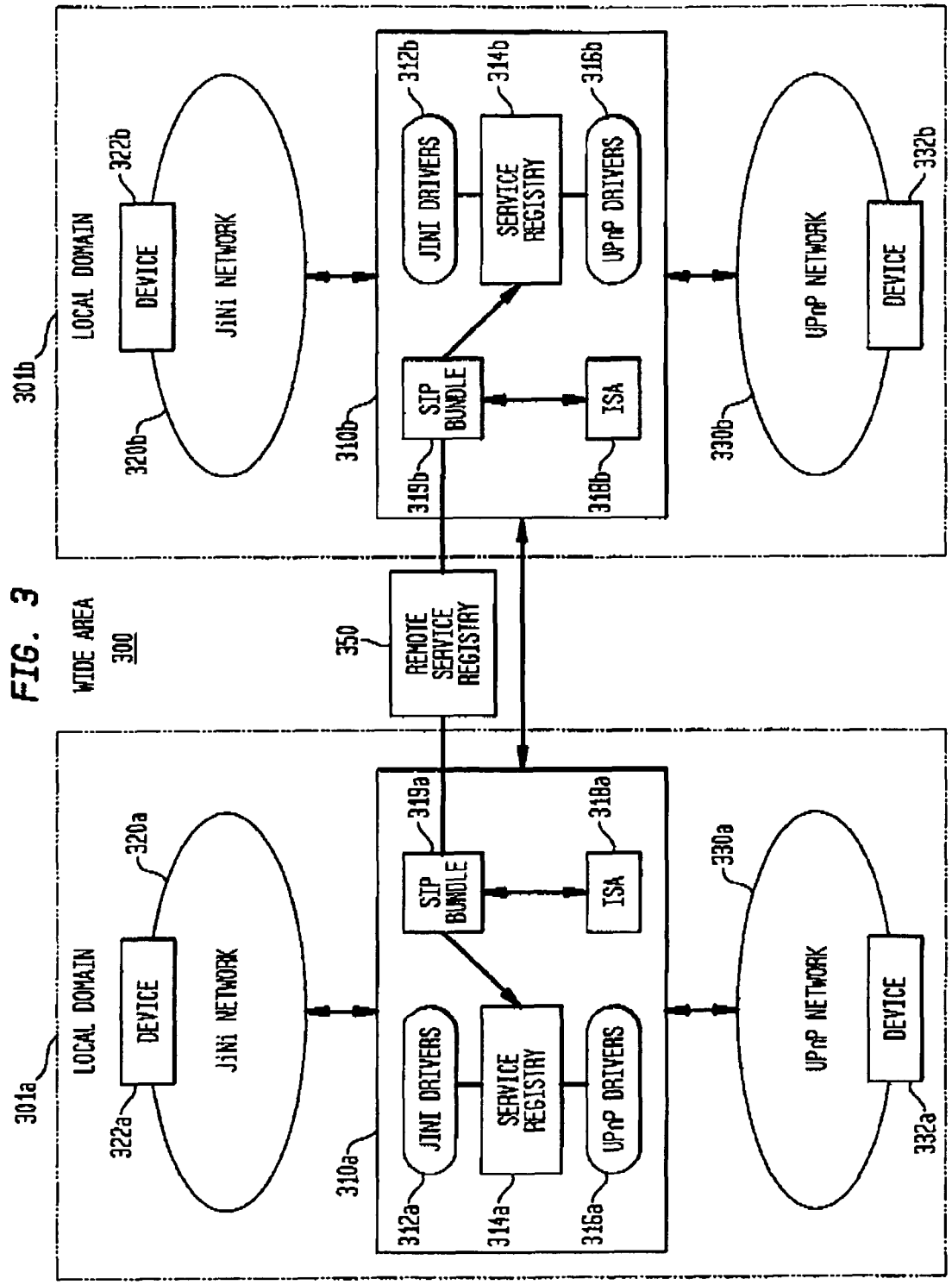
FIG. 3 depicts the architecture of a first embodiment of a system in accordance with the present invention.

FIG. 3 is a diagram depicting an architecture of a first embodiment of system 300 of our invention that allows devices on separate local domains to discover and communicate with each other using the device communication technology native to each device. System 300 depicts only two local domains. This is for explanatory purposes only and our invention is applicable to a remote device discovery and communication across a plurality of domains. The term device is also used for explanatory purposes and should not be used to limit the invention to devices only. The architecture and method of the present invention can be used to provide communication between a variety of different service components in different domains, for example, access to databases through an associated database driver.

Each local domain 301a, 301b comprises a service gateway 310a, 310b that bridges communities/networks of communication technologies, including Jini, UPnP, Havi, etc. The exact communication technologies bridged by a services gateway is not specific to our invention and FIG. 3 uses the Jini and UPnP technologies for explanatory purposes only. Similar to existing OSGi gateways, each service gateway 310a, 310b comprises a service registry 314a, 314b and a plurality of driver bundles such as the OSGi Jini driver bundles 312a, 312b and UPnP driver bundles 316a, 316b for each of the different network communities. Each networked community comprises networked devices including PCs, laptops, printers, network appliances (e.g., lighting systems, heaters, etc.), for example. For clarity each network (Jini networks 322a, 322b and UPnP networks 332a, 332b) is depicted with only one device (332a, 332b, 332a, 332b) attached. With respect to the local domains 301a, 301b, each service gateway 310a, 310b together with its corresponding service registry 314a, 314b and Jini driver bundles 312a, 312b and UPnP driver bundles 316a, 316b continues to operate as described for the prior art by providing device discovery and communications within the local domain.

In accordance with our invention, each service gateway 310a, 310b of system 300 further comprises an integration service application 318a, 318b and a SIP bundle 319a, 319b. System 300 also comprises a remote service registry 350. As shown on FIG. 3, this registry is located within a wide are network although as further described below, it can also reside on service gateway. Although in FIG. 3 and the accompanying discussion reference is made to the use of a SIP bundle, SIP is only one type of instant messaging protocol that could be used in the system and method of the present invention. Other types of instant messaging protocols such as those used in various instant-messaging schemes could also be used.

Figure 4:
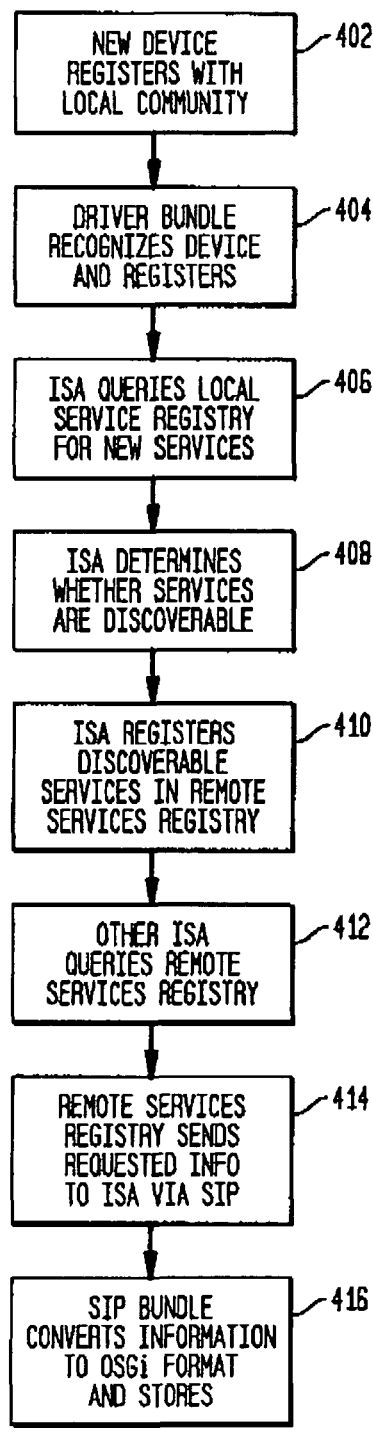
FIG. 4 is a flow diagram depicting an embodiment of the method steps of the present invention for discovering devices and services between local domains.

FIG. 4 is a flow chart depicting a first embodiment of the method steps of our invention for discovering devices and services between local domains 301a, 301b. For explanatory purposes, assume that local domain 301a would like to make device 322a in Jini network/community 320a discoverable and controllable by a PC, device 332b in the UPnP network/community 330b within local domain 301b. Assume further that device 332a is being added to the Jini network community. Beginning with step 402, device 332a first registers with a lookup service within the Jini network/community 320a as defined by the Jini technology. In accordance with the existing OSGi framework, in step 404 the Jini drive bundle 312a discovers the new device in the lookup table and registers the new device and its services in the service registry 314a as an OSGi service.

In step 406, the integration service application (ISA) 318a queries the service registry 314a for new services. The integration service application may perform this query on a periodic basis, determining if new services have been added to the framework. Alternatively, the service gateway may notify the integration service application that a new service has been added, prompting the service application to perform the query. Regardless, using an OSGi API defined for the SIP bundle 319a, the integration service application 318a uses the SIP bundle to query the service registry 314a for new services. Alternatively, the integration services application 318a may directly query the service registry 314a for new services. In this example, the integration services application 318a will receive the OSGi object describing the device 322a and its associated services.

In step 408, the integration services application 318a next determines if all or a subset of the newly registered services corresponding to device 322a should be made discoverable by devices in the remote domains. The integration services application does this based on the "policy" specified by the owner or manager of the domain. That is a domain manager would specify (though a configuration interface) what devices can be visible to remote domains (note this could be different for different remote domains). Thus, the policies may be arbitrarily set by the domain manager. If none of the services should be made discoverable, the integration services application 318a ignores the new device 322a. However, assuming the new services should be made discoverable, the integration service application proceeds to register the device and its services in the remote service registry 350. Specifically, in step 410, the integration service application invokes the SIP bundle 319a to register all or a subset of the services of device 322a in the remote services registry 350.

In particular, the SIP bundle 319a registers both the address/location of the device/services and a description of the device/services. The SIP bundle performs this registration using methods described in U.S. patent application Ser. No. 09/774,999 entitled (Now Abandoned), "System and Method for Using Session Initiation Protocol (SIP) to Communicate with Networked Appliances" by Stanley Moyer, David Marples, and Christian Huitema, which application is hereby incorporated by reference. Specifically, the SIP bundle 319a creates a SIP REGISTER message that includes as payload the OSGi service data describing the device/services being registered. As part of incorporating the OSGi service data, the SIP bundle 319a converts the data into an XML based Device Description Protocol so that it can be carried in the SIP message. In addition, the SIP bundle further specifies the address/location of the device/services by indicating the device/services are part of network 320a within local domain 301a. Once the message is formatted, the SIP bundle 319a sends the REGISTER message to the database comprising the remote service registry 350. Instead of using SIP, the present invention could also make use of other protocols such as instant messaging protocols in a similar manner.

In step 412, the integration service application 318b in local domain 301b queries the remote service registry 350 for new services. The integration service application of a local domain will perform this query on a periodic basis, determining if new services have been added to the database comprising the remote service registry. Querying could also occur "on demand"—e.g., only when a change of state happens in the local domain such as when a new service starts up and queries the registry in the local domain. The integration service application 318b could detect this change and then query the remote registry 350 to update its information. The integration service application 318b performs this query through OSGi API defined for the SIP bundle. Upon being invoked, the SIP bundle 319b sends a query message (or other appropriate message) to the remote service registry 350 requesting all registered devices/services (i.e., the device/services descriptions and locations/addresses). This request could be for all registered devices or only for information on devices registered since the last query depending on the implementation. At step 414 the remote services registry 350 replies by sending a response message containing the requested information regarding new devices/service. Upon receiving a response from the remote service registry 350, the SIP bundle in step 416 converts the device/services description back to OSGi service data format and stores the information in the service registry 314b. In accordance with the OSGi framework, the SIP driver bundle 319b is then associated with the newly registered services.

Upon registering the new services, the service gateways 310a, 310b, Jini driver bundles 312a. 312b and UPnP driver bundles 316a, 316b operate in a manner similar to the prior art, making the newly registered devices and services discoverable to the Jini devices and UPnP devices in the Jini domains 320a, 320b and UPnP domains 330a, 330b. Specifically, upon detecting the newly registered service, the UPnP driver 316b determines if it is compatible with the UPnP architecture, and if so, it exports the service information to the UPnP network 330b (using UPnP protocols) making the remote Jini device 322a and associated services appear in the UPnP network/community 330b like local UPnP devices such as device 332b. Similarly, Jini driver bundle 312b, upon detecting the newly registered device/services in service registry 314b, exports the device/services to the Jini network/ community 320b by registering the device/services in a lookup service, making the remote Jini device 322a and associated services appear in the Jini network community 320b like local Jini devices such as device 322b. As such, in accordance with our invention, UPnP device 332b (which could be a PC) can discover the remote Jini device 322a using native UPnP protocols and is unaware as to whether the device is local or remote or is a Jini or UPnP based device. Similarly, Jini device 322b can discover the remote Jini device 322a as if it is a local device within Jini community 320b. Note that a similar method is used to export the devices/services of local domain 301b (as well as any number of other local domains not shown) to local domain 301a, with integration service applications 318a and 318b performing opposite roles.

Figure 5:
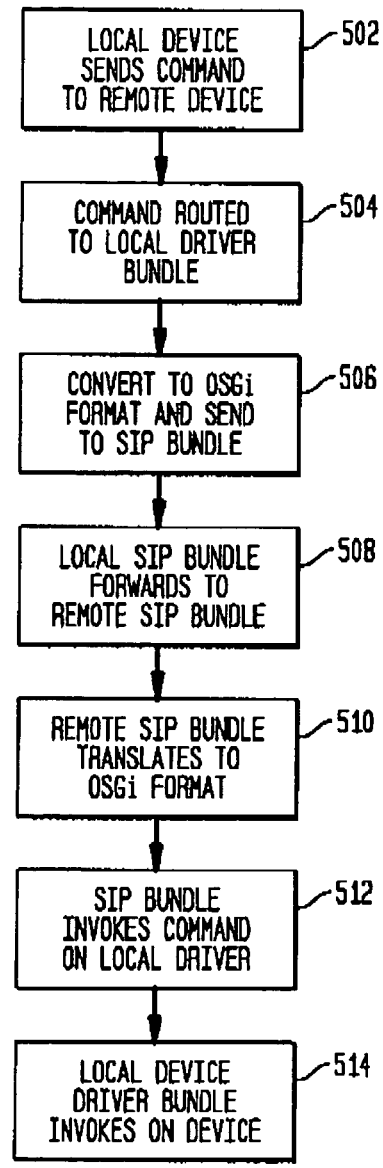
FIG. 5 is a flow chart depicting the process in accordance with the present invention for communicating between a local device and a remote device using native technologies.

Now that remote devices are transparently discoverable between local domains using native communication technologies, reference will be made as to how local devices communicate with remote devices/services using native technologies. FIG. 5 is a flow chart depicting these communications. For explanatory purposes, assume that the device 332a, a PC within local domain 301a in UPnP community 330a would like to control device 322b in Jini community 320b of local domain 301b. Beginning with step 502, device 332a sends a command to the remote device using the PC's native protocol (here, UPnP). As under the prior art OSGi framework, this command is routed in step 504 to the UPnP driver bundle 316a, which translates the command to an OSGI form and sends it to the SIP bundle 319a in step 506 (again, the prior art OSGi mechanisms are used).

Upon receiving the command from the UPnP driver bundle 316a, the SIP bundle 319a forwards in step 508 the command to the SIP driver bundle of services gateway 314b. Again, the SIP bundles perform these communications using methods described in U.S. patent application Ser. No. 09/774,999 entitled (Now Abandoned), "System and Method for Using Session Initiation Protocol (SIP) to Communicate with Networked Appliances." In particular, the SIP bundle 319a will act as a SIP user agent client and the SIP bundle 319b will act as a SIP user agent server Accordingly, the SIP bundle 319a will create a SIP message, addressing the message to the device/service at domain 301b, noting device 322b as the "contact" for routing all return requests, and inserting the command as the payload of the message. Here, the SIP bundle 319a will use an XML-based device message protocol for representing the command. The exact type of SIP message sent depends on the nature of the command. Specifically, if a control or query command is being sent to the remote device, the SIP driver bundle will use a SIP DO message. If the command is requesting notification of an event, the SIP driver bundle will use SIP SUBSCRIBE message or other appropriate message.

Upon receiving the SIP message with the enclosed command, the SIP driver bundle 319b in step 510 translates the command back to an OSGi form and invokes the command on the appropriate device driver bundle (here, the Jini driver bundle 312b) at step 512, again, using established OSGi mechanisms. The device address information contains the necessary information to determine which OSGi service registry entry corresponds to the desired device. The registry entry then contains a pointer to the appropriate OSGi "bundle. (Finally, in step 514 the Jini device driver bundle 312b translates the OSGi form of the command to the Jini format and invokes the command on the Jini device 322b.

Note that in general, device 322b will respond to the command (e.g. indicate the command was executed or not executed successfully, return a queried for value, etc.). Here, device 322b will respond to the command using its native protocol, which response will be sent to its corresponding driver device bundle 312b. This device bundle will in turn translate the response to an OSGi form and send it to the SIP driver bundle 319b. (again, these mechanisms operate as under the current prior art). Upon receiving the response, the SIP bundle 319b will create a SIP reply message, addressing the message back to the device (PC) 332a at UPnP network 330a in domain 301 a and including an XML-based form of the response. The SIP bundle 319b will then transmit the message, which will get routed to SIP bundle 319a. Upon receiving the SIP reply message with the enclosed response, the SIP bundle 319a translates the command back to an OSGi form and invokes the command on the appropriate device driver bundle (here, the UPnP bundle 316a), again, using established OSGi mechanisms. Finally, the UPnP device driver bundle 316a translates the OSGi form of the command to the UPnP format and forwards the response to the UPnP device 332a.

As indicated, it is also possible for a device such as device (PC) 332a to request notification of an event from a remote device such as Jini device 322a. Unlike sending a command or query that requires a response (i.e., synchronous operation), event notification is asynchronous. As described, SIP bundle 319a uses the SIP SUBSCRIBE message when conveying the event notification request between domains. When the Jini device is ready to provide notification of the event, the method of FIG. 5 is followed. However, here, the SIP bundle 319b will use a SIP NOTIFY message to convey the event to SIP bundle 319a.

Lastly, it should be noted that there may be times when a device will need to convey a stream of audio or video, for example, to a device. As described above, use of a message, such as a SIP SUBSCRIBE MESSAGE, or NOTIFY messages, does not require a session be established between the SIP bundles. However, if the SIP bundles are required to convey audio/video/etc., the SIP bundles will use the INVITE message to establish a session between the two services gateways.

The above-described embodiments of our invention are intended to be illustrative only. Numerous other embodiments may be devised by those skilled in the art without departing from the spirit and scope of our invention including the use of other instant messaging protocols in place of the SIP standard discussed herein.

We claim:

1. A method for communicating between a first device on a first network associated with a first domain having a service gateway comprising a local service registry, device drivers, an instant messaging protocol bundle and an integrated services application (ISA) and a second device on a second network associated with a second domain, the method comprising:
   discovering, at the first device, a first service indication representing a service available at the first device using a first device discovery protocol and transforming the first service indication that is represented in the first device discovery protocol to a second service indication represented in a second device discovery protocol different from the first device discovery protocol;
   storing, at the first device, the second service indication in the local service registry of the service gateway in the first domain;
   determining at the ISA of the first domain that the second service indication associated with the registered first device is to be discoverable in at least the second domain and responsively registering the second service indication at a remote services registry, wherein the determining comprises referencing an owner-defined policy or manager-defined policy specifying whether a given device should be made visible to a remote domain;
   if the second service indication is not discoverable, ignoring the second service indication, otherwise;
   querying, by the first device, the remote services registry for obtaining one or more new service indications registered since a previous query; and
   responsive to obtaining the one or more new service indications from the remote service indications services registry, transforming, at the first device, the received new represented in the second device discovery protocol to new service indications represented in the first device discovery protocol and exporting the transformed new service indications to the first network using the first device discovery protocol.

2. The method of claim 1, further comprising:
   determining that discoverable services associated with devices in the second domain are registered in the remote services registry;
   receiving the discoverable services from the remote services registry; and
   storing information on the discoverable services in the local service registry of the first domain.

3. The method of claim 2, wherein receiving the discoverable services from the remote services registry to comprises receiving an instant messaging protocol packet at the instant messaging protocol bundle of the services gateway of the first domain.

4. The method of claim 3, wherein the instant messaging protocol bundle of the services gateway of the first domain, stores the discoverable services in Open Services Gateway Initiative (OSGi) format in the local services registry.

5. The method of claim 1, wherein registering the transformed services at the remote services registry comprises sending an instant messaging protocol command from the instant messaging protocol bundle of the services gateway of the first domain to the remote services registry, and wherein the instant messaging protocol is different from the first and second device discovery protocols.

6. The method of claim 1, wherein the owner-defined policy or manager-defined policy is set by a manager of the first domain.

7. The method of claim 1, wherein the querying is performed in response to a notification that a new service has been added to the remote services registry.

8. A gateway on a first network associated with a first domain for enabling communication between a first device on the first network and one or more second devices on a second network associated with a second domain different than the first domain, the gateway configured to:
   discover a first service indication representing a service available at the first device using a first device discovery protocol;
   transform the first service indication represented in the first device discovery protocol to a second service indication represented in a second device discovery protocol different from the first device discovery protocol;
   store the second service indication in a local service registry store;
   determine that the second service indication is to be made discoverable to at least one or more of the second devices on the second network and responsively register the second service indication in a remote services registry, wherein the determining comprises referencing an owner-defined policy or manager-defined policy specifying whether a given device should be made visible to a remote domain;
   if the second service indication is not discoverable, ignoring the second service indication, otherwise;
   querying the remote services registry for obtaining one or more new service indications registered since a previous query; and
   responsive to obtaining the one or more new service indications from the remote services registry, transform the new service indications represented in the second device discovery protocol to new service indications represented in the first device discovery protocol mid export the transformed new service indications to the first network using the first device discovery protocol.

9. The gateway of claim 8, wherein the gateway is further configured to execute a query for the one or more new service indications responsive to a presence of the second service indication in the local service registry store.

10. The gateway of claim 8, wherein the second network runs on a third device discovery protocol, the third device discovery protocol being different than the first and second device discovery protocols.

11. The gateway of claim 10, wherein the first and third device discovery protocols are selected from the group consisting of Jini, Salutation, UPnP, X10, HomePlug, HomePNA, HomeRF, Bluetooth, HAVi, HiperLAN, WiFi (IEEE 802.11a/b/g), IEEE 802.15, IEEE 1394, and WiMAX.

12. The gateway of claim 8, wherein the second device discovery protocol is based on the Open Services Gateway Initiative (OSGI) framework.

13. The gateway of claim 8, wherein registering the second service indication in the remote service registry comprises generating a message according to a messaging protocol, different than the first and second device discovery protocols, having a payload comprising an address of the first device and the second service indication, and transmitting the message to the remote service registry.

14. The gateway of claim 13, wherein the remote service registry is located in a third network coupling the first and second networks together.

15. The gateway of claim 13, wherein the messaging protocol is based on the SIP protocol.

16. The gateway of claim 13, wherein the remote service registry is located within the gateway, separate from the local service registry store.

17. The gateway of claim 8, wherein the gateway is further configured to query the remote service registry for the one or more new service indications responsive to receiving a discovery request from another device on the first network using the first device discovery protocol.

18. The gateway of claim 17, wherein the gateway is further configured to store the one or more new service indications in the local service registry store.

19. The gateway of claim 8, wherein the remote service registry comprises a database containing the address/location of devices/services that are available in both the first and second domains.

20. A method for enabling communication between a first device on a first network associated with a first domain and one or more second devices on a second network associated with a second domain different than the first domain comprising:
 discovering, a the first device, a first service indication representing a service available at the first device using a first device discovery protocol and transforming the first service indication represented in the first device discovery protocol to a second service indication represented in a second device discovery protocol different from the first device discovery protocol;
 storing, at first device, the second service indication in a local service registry store;
 determining, at the first device, that the second service indication is to be made discoverable to at least the second devices on the second network and responsively registering the second service indication in a remote services registry, wherein the determining comprises referencing an owner-defined policy or manager-defined policy specifying whether a given device should be made visible to a remote domain;
 if the second service indication is not discoverable, ignoring the second service indication, otherwise;
 intermittently querying, by the first device, the remote services registry for obtaining one or more new service indications registered since a previous query; and
 responsive to obtaining the one or more new service indications from the remote services registry, transforming, at the first device, the new service indications represented in the second device discovery protocol to new service indications represented in the first device discovery protocol and exporting the transformed new service indications to the first network using the first device discovery protocol.

21. The method of claim 20, further comprising: querying for the one or more new service indications in response to a presence of the second service indication in the local service registry store.

22. The method of claim 20, wherein the second network runs on a third device discovery protocol, the third device discovery protocol being different than the first and second device discovery protocols.

23. The method of claim 22, wherein the first and third device discovery protocols are selected from the group consisting of Jini, Salutation, UPnP, X10, HomePlug, Home-PNA, HomeRF, Bluetooth, HAVi, HiperLAN, WiFI (IEEE 802.11 a/b/g), IEEE 802.15, IEEE 1394, and WiMAX.

24. The method of claim 20, wherein the second device discovery protocol is based on the Open Services Gateway Initiative (OSGi) framework.

25. The method of claim 20, wherein registering the second service indication in the remote service registry comprises generating a message according to a messaging protocol, different than the first and second device discovery protocols, having a payload comprising an address of the first device and the second service indication, and transmitting the message to the remote service registry.

26. The method of claim 25, wherein the remote service registry is located in a third network coupling the first and second networks together.

27. The method of claim 25, wherein the messaging protocol is based on the SIP protocol.

28. The method of claim 20, wherein the remote service registry is located separate from the local service registry store.

29. The method of claim 20, wherein the remote service registry comprises a database containing the address/location of devices/services that are available in both the first and second domains.

30. The method of claim 20, further comprising querying the remote service registry for the one or more new service indications available on the second network responsive to receiving a discovery request from another device on the first network using the first device discovery protocol.

31. The method of claim 30, further comprising:
 storing the one or more new service indication in the local service registry store.

* * * * *

UNITED STATES PATENT AND TRADEMARK OFFICE
CERTIFICATE OF CORRECTION

PATENT NO. : 8,549,541 B2
APPLICATION NO. : 11/091555
DATED : October 1, 2013
INVENTOR(S) : Moyer et al.

It is certified that error appears in the above-identified patent and that said Letters Patent is hereby corrected as shown below:

In the Specifications

In Column 1, Line 43, delete "WiFI" and insert -- WiFi --, therefor.

In Column 1, Line 56, delete "OSGI" and insert -- OSGi --, therefor.

In Column 2, Line 47, delete "OSGI" and insert -- OSGi --, therefor.

In Column 4, Line 37, delete "domain" and insert -- domain. --, therefor.

In Column 4, Line 65, delete "is depicts" and insert -- depicts --, therefor.

In Column 4, Line 67, delete "domains" and insert -- domains. --, therefor.

In Column 5, Line 52, delete "wide are" and insert -- wide area --, therefor.

In Column 7, Line 67, delete "OSGI" and insert -- OSGi --, therefor.

In Column 8, Line 12, delete "server" and insert -- server. --, therefor.

In the Claims

In Column 10, Line 5, in Claim 4, delete "domain," and insert -- domain --, therefor.

In Column 10, Line 52, in Claim 8, delete "mid export" and insert -- and export --, therefor.

In Column 10, Line 66, in Claim 11, delete "WiFI" and insert -- WiFi --, therefor.

In Column 11, Line 37, in Claim 20, delete "a the first" and insert -- at the first --, therefor.

In Column 11, Line 44, in Claim 20, delete "at first" and insert -- at the first --, therefor.

Signed and Sealed this
First Day of April, 2014

Michelle K. Lee
*Deputy Director of the United States Patent and Trademark Office*

CERTIFICATE OF CORRECTION (continued)
U.S. Pat. No. 8,549,541 B2

In Column 12, Line 22, in Claim 23, delete "HorneRF," and insert -- HomeRF, --, therefor.

In Column 12, Line 22, in Claim 23, delete "WiFI" and insert -- WiFi --, therefor.